United States Patent [19]

Ishii et al.

[11] Patent Number: 5,145,635
[45] Date of Patent: Sep. 8, 1992

[54] FUEL ASSEMBLY AND NUCLEAR REACTOR

[75] Inventors: Kazuya Ishii, Hitachi; Motoo Aoyama, Mito; Yoshihiko Ishii, Hitachioota; Sadao Uchikawa, Katsuta; Renzo Takeda, Kawasaki; Osamu Yokomizo, Toukai, all of Japan

[73] Assignee: Hitachi, Ltd., Tokyo, Japan

[21] Appl. No.: 669,378

[22] Filed: Mar. 14, 1991

[30] Foreign Application Priority Data

Mar. 14, 1990 [JP] Japan ................................. 2-61013

[51] Int. Cl.⁵ ............................................... G21G 1/06
[52] U.S. Cl. ................................... 376/173; 376/428; 376/373; 376/212
[58] Field of Search ............... 376/435, 428, 434, 172, 376/212, 373, 173; 976/DIG. 63, DIG. 111, DIG. 19

[56] References Cited

U.S. PATENT DOCUMENTS

| 2,998,367 | 8/1961 | Untermyer | 376/373 |
| 3,910,818 | 10/1975 | Sofer | 376/210 |
| 4,096,033 | 6/1978 | Barry | 376/173 |
| 4,986,958 | 1/1991 | Hajkawa | 376/419 |

FOREIGN PATENT DOCUMENTS 1227993 9/1991 Japan .

Primary Examiner—Brooks H. Hunt
Assistant Examiner—Meena Chelliah
Attorney, Agent, or Firm—Antonelli, Terry Stout & Kraus

[57] ABSTRACT

A high conversion nuclear reactor core has fuel assemblies made up from large numbers of axially-extending uranium-plutonium mixed oxide fuel rods. The fuel rods are densely packed so as to give a high conversion ratio of fissile substances, preferably approaching unity. The average plutonium enrichment in the assemblies is higher in their bottom, upstream halves, than in their top downstream halves. This has the effect of reducing a potentially dangerously high void coefficient in the core.

22 Claims, 4 Drawing Sheets

FUEL ASSEMBLY AND NUCLEAR REACTOR

FIELD OF THE INVENTION

This invention relates to nuclear fuel assemblies and nuclear reactors. In particular, it is concerned with light water cooled, light water moderated reactors, having a high conversion ratio of fertile to fissile substances with uranium-plutonium mixed fuel.

BACKGROUND OF THE INVENTION

In a nuclear reactor, fissile substances such as uranium-235 are consumed by a fission reaction, new fissile substances such as plutonium-239 being yielded as uranium-238 undergoes neutron absorption. The conversion ratio of the reactor is the ratio, at the time of unloading a spent fuel assembly, of the amount of fissile substance yielded to the amount of fissile substance consumed. In a conventional light water cooled and moderated reactor the conversion ratio is about 0.5. With the general aim of conserving uranium resources, recently there has been interest in increasing the conversion ratio of reactors.

In particular, recently published JP-A-1/227993 discloses a fuel assembly construction designed to achieve a conversion ratio approaching unity. The fuel assembly comprises an array of fuel rods arranged in a particularly dense configuration so that the effective volume ratio of water to fuel, as an average over the assembly, is not more than 0.4. The reactor is a boiling water reactor. So, this densely-packed fuel assembly construction will provide for recovery of nearly as much plutonium-239 etc. as the amount of fissile substance (uranium-235, plutonium-239) consumed. The recovered plutonium can be used to enrich uranium from any suitable source, and this can be burned in a nuclear reactor.

In a reactor, however, there are many factors other than conversion ratio which are important. In particular, reactors must be safe not only during normal operation but also should some abnormal transient condition arise. In a conventional boiling water reactor, the effective volume ratio of water to fuel is usually about 2.0; much higher than in JP-A-1/227993. With a soft neutron spectrum, the void coefficient of uranium-plutonium mixed fuel (void coefficient=change of reactivity with change of void fraction of coolant) is much less (more negative) than the corresponding void coefficient for an enriched uranium fuel. When the fuel rod configuration is made more dense to raise the conversion ratio, as disclosed in JP-A-1/227993, we observe that the void coefficient of uranium-plutonium mixed fuel tends to increase and approach positive values. Indeed, the prior art core having effective water to fuel volume ratio of 0.4 has a positive void coefficient.

This has important implications as regards safety. The safety of a reactor in the event of some abnormal transient or accident can be assessed with reference to a power coefficient. The power coefficient is the rate of reactivity change with unit power change, and is expressed as a sum of the void coefficient and a Doppler coefficient which is a component indicating reactivity change with temperature.

In fact, the particular construction described in JP-A-1/227993 does have a negative power coefficient and hence is safe in principle, because the Doppler coefficient is sufficiently negative to compensate for the positive value of the void coefficient. For increased control of safety, however, it would be desirable not to have to rely on the Doppler coefficient, but to be able to reduce (i.e. make less positive or more negative) the void coefficient contribution to the power coefficient.

It is known that void coefficient of a reactor core can be kept down by constructing the core so that electrons can leak easily, since void coefficient in a core depends on a sum of the changes of neutron infinite multiplication factor and neutron leakage value. Leakage of neutrons can suppress neutron infinite multiplication factor since although increased void fraction increases the number of neutrons in the core, it also increases the amount of leakage. However, a core which allows neutrons to leak easily has serious disadvantages, namely a lowering of reactivity with the leakage of neutrons at steady state.

SUMMARY OF THE INVENTION

In view of the above, it is a primary object herein to enable a high conversion water reactor using uranium-plutonium mixed oxide fuel to have a power coefficient commensurate with safety, and preferably improved safety, without a disadvantageous loss in reactivity. This is a new object which we have perceived in relation to these new, high conversion reactors. To achieve this object would contribute to the practical usefulness of a high conversion reactor.

According to the invention, surprisingly we can reduce the void coefficient by using a fuel assembly comprising a plurality of uranium-plutonium mixed oxide fuel rods extending axially between a water coolant intake end (upstream) and a water coolant discharge end (downstream), the rods being densely packed to give a high conversion ratio, and in which the plutonium enrichment is axially non-uniform in an effective fuel region of the assembly, such that an upstream half of the effective fuel region has a higher average plutonium enrichment than the corresponding enrichment in the downstream half.

In other aspects, the invention provides a reactor core consisting of a plurality of such fuel assemblies, a nuclear reactor loaded with the assemblies, and a method of operating such a reactor at a high conversion ratio.

It should be noted that the invention applies only to high conversion reactors, in particular to those which operate with an effective water to fuel volume ratio which is usually less than 1.5 and most preferably 0.4 or less. Operating such a reactor is desirably so as to achieve a conversion ratio of at least 0.6, more preferably greater than 0.8 and most preferably about 1.0.

The difference in average plutonium enrichment between the upstream and downstream halves of the effective fuel region should be at least 0.05% but usually less than 1.5%; a larger void coefficient reduction may be obtained in the range of 0.1 to 1.1% enrichment difference. The overall average plutonium enrichment in the effective fuel region is not usually more than about 10% by weight. The fuel region should preferably contain uranium-plutonium mixed oxide fuel for substantially its entire axial extent so that a good output is achieved.

The effect achieved by the invention is a surprising one. In the prior art, a fuel assembly having a non-uniformity of plutonium enrichment has already been disclosed in JP-A-60/66187. This is a conventional, low-conversion reactor in which the fuel rods of the assembly are not densely packed. These fuel rods have a downstream portion of uranium fuel, and an upstream portion—which may be as much as two-thirds of the fuel region—of plutonium-uranium mixed oxide fuel. Consequently, the average enrichment of plutonium is greater upstream. However, in JP-A-60/66187 the higher upstream plutonium enrichment is disclosed as increasing the void coefficient of the reactor which, though perfectly safe, has a void coefficient so low as to be inadequate. The effective volume ratio of water to fuel in this prior art document is the conventional value; about 2.0.

The present inventors have discovered that in a high conversion reactor, where the fuel rods are relatively densely packed, quite the opposite effect can be achieved. That is, by having a higher plutonium enrichment at the upstream half a void coefficient which otherwise might be dangerously high can be reduced.

This is based on the appreciation that, when fuel rods are densely packed and the reactor is operated at a low effective water:fuel volume ratio e.g. less than 0.4, the fuel gives a positive void coefficient all over the range of voids fraction; fuel of lower plutonium enrichment gives a smaller void coefficient than a highly enriched fuel at the same degree of burn-up and, for a given plutonium enrichment, a larger void coefficient is achieved for a fuel operating at a higher burning average void fraction. By reducing the relative enrichment in the upper region where the void fraction is high, the contribution of this upper region to void coefficient can be reduced. Relatively high enrichment in the lower region, however, contributes less seriously to void coefficient while maintaining good reactivity. These effects will be described below in more detail.

The fuel assembly may have portions of relatively low enrichment at both ends of the effective fuel region. These can increase the overall reactivity by limiting the large neutron infinite multiplication factor towards the central part of the effective fuel region, where the contribution to reactivity is large.

Preferred aspects of the invention provide particular distribution patterns for regions of uniform enrichment in the axial dimension, which provide variously for different effects on the void coefficient, ease of construction, good reactivity etc. according to choice.

Fuel assemblies embodying the invention are constructed so as to operate at high conversion ratios. To achieve the necessary low effective water:fuel volume ratio in operation, the geometrical coolant space:fuel volume ratio will also generally be substantially smaller than conventional. For example, it may be less than 1.5, more particularly less than 1.0.

BRIEF DESCRIPTION OF THE DRAWINGS

Embodiments of the invention are now described by way of example, with reference to the accompanying drawings in which.

DETAILED OF THE PREFERRED EMBODIMENTS

Figure 1:
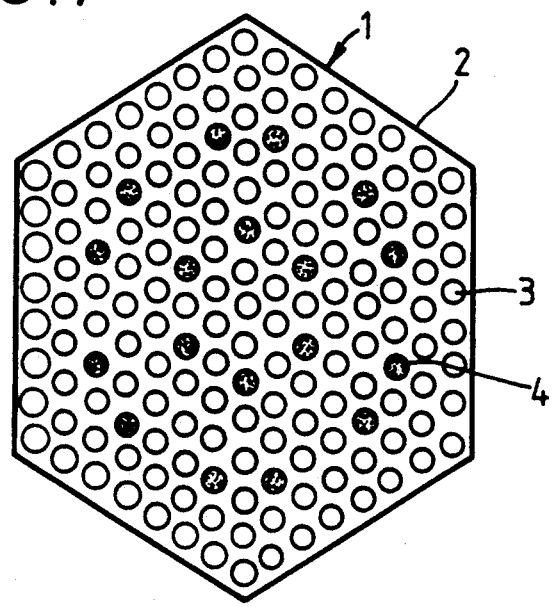
FIG. 1 is a schematic horizontal section through a fuel assembly.

Referring firstly to FIG. 1, a fuel assembly 1 for a nuclear reactor core, comprises 151 fuel rods 3 arranged axially vertically in a channel box 2 having a hexagonal outer shape. The rods 3 are packed extending side-by-side in the channel box 2 in a close-packed hexagonal lattice. They are mounted by conventional mounting means. Eighteen lattice sites are occupied by control rod guide tubes 4, again in a conventional manner.

The outer diameter of each fuel rod is 11.8 mm and the fuel rods are spaced apart by 1.3 mm, giving a geometrical water:fuel volume ratio of 0.5. The reactor is a boiling water reactor, and the aim is to achieve an effective water:fuel volume ratio preferably not more than 0.4, with a view to achieving a conversion ratio approaching unity. With the configuration described, a void fraction of 20% will give an effective water:fuel volume ratio of about 0.4, while this latter ratio falls to about 0.24 when the void fraction rises to 55%.

Figure 2:
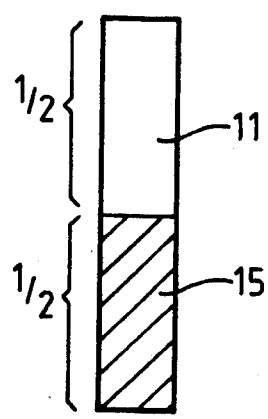
FIG. 2 is a schematic vertical section of an effective fuel region of the fuel assembly, in a first embodiment.

The part of the fuel assembly charged with uranium-plutonium mixed fuel, or enriched uranium fuel, is referred to hereinafter as the "effective fuel region". FIG. 2 shows schematically the axial extent of this region for a first embodiment. The effective fuel region is divided into a top half and a lower half. The uranium-plutonium mixed oxide fuel 15 making up the lower half has an enrichment of 7.0% (enrichment is given here and hereinafter as weight %) of fissile plutonium. The fuel 11 making up the upper half of the effective fuel region has a fissile plutonium enrichment of 6.0%. Thus, the average enrichment of the fuel assembly is 6.5% fissile plutonium, but the upper half has a lower average enrichment than the lower half. In this embodiment, the conceptual boundary between upper and lower halves in fact coincides with an actual boundary between two regions of different plutonium enrichment. That is, the average enrichment throughout the upper half region is 6.0% and throughout the lower half region is 7.0%.

In this embodiment, natural uranium enriched with plutonium is used. However, it will be appreciated that recovered uranium from spent fuel reprocessing, depleted uranium from enriching operations, slightly enriched uranium, or a mixture of any of these might be used for enrichment with plutonium. Furthermore, oxide sintered bodies of natural or depleted uranium may be placed at the end peripheries of the fuel region ends to decrease neutron leakage from the reactor core and to provide neutron shielding, in a known manner.

Figure 3A:
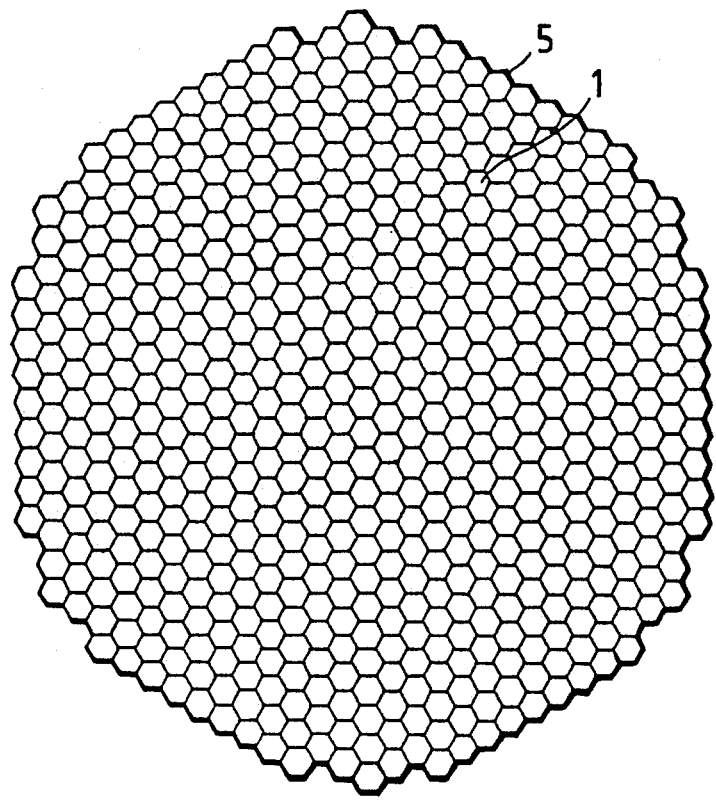
FIG. 3(a) is a schematic horizontal section of a reactor core loaded with fuel assemblies.

FIG. 3(a) shows a nuclear reactor core made up from six hundred and one of the fuel assemblies 1. In the reactor core 5, the fuel assemblies are positioned axially vertically and coolant flows through them axially upwardly from the bottom (inlet) end to the top (outlet) end.

Figure 3B:
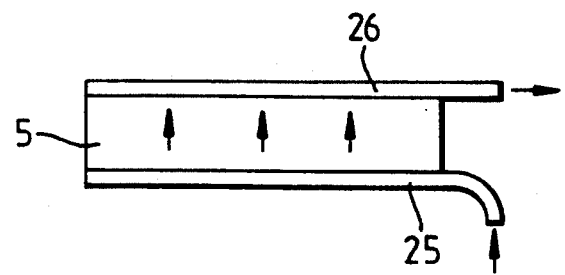
FIG. 3(b) is a schematic side view of the core, in a nuclear reactor.

FIG. 3(b) shows how, in a nuclear reactor, the core 5 is arranged horizontally, with the assemblies 1 axially vertical, between coolant supply 25 and coolant take-off 26 of the reactor (shown schematically).

In an embodiment, the reactor core had the following specification.

TABLE 1

| Thermal output | 2700 MW |
|---|---|
| Electrical output | 900 MW |
| Number of fuel assemblies | 601 |
| Height of reactor core | 2.00 m |
| Coolant flow rate | 2.25 × 10⁴ t/h |
| Core outlet quality | 27% |
| Specific power | 17.5 kW/kg |
| Power density | 85.2 kW/l |

Figure 4:
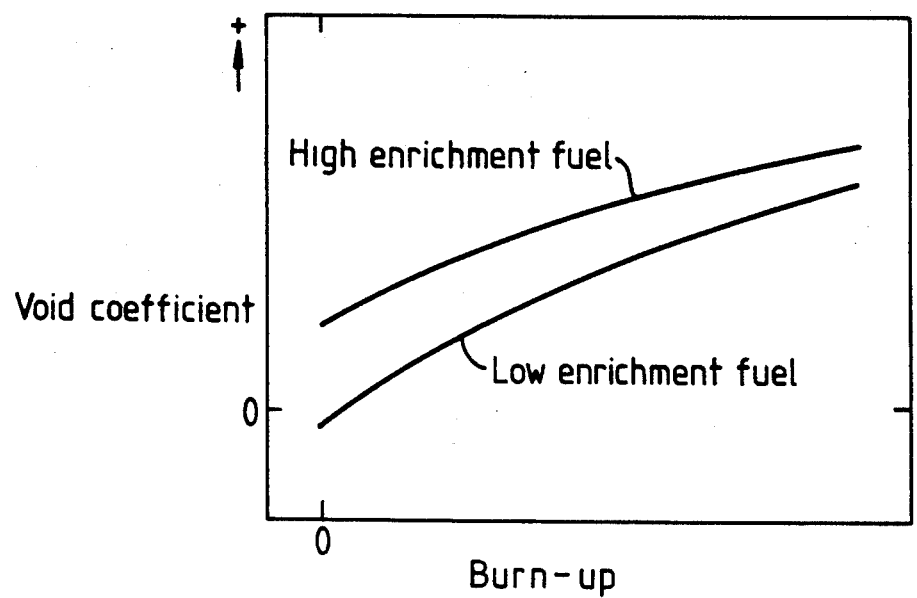
FIG. 4 is a graph showing a relationship between void coefficient, plutonium enrichment and burnup.

Under reactor conditions of low water:fuel volume ratio e.g. 0.24, maintained with a view to achieving high conversion ratio, a relationship between plutonium enrichment, burn-up, and void coefficient is as shown in FIG. 4. FIG. 4 shows how a fuel having a lower enrichment of plutonium gives a smaller void coefficient than a highly enriched fuel at the same degree of burn-up. The difference becomes smaller as burning of fuel proceeds, but in a normal burn-up range for a light water reactor fuel, i.e. about 45 GWd/t, there is always a difference as shown and the lines do not cross.

Figure 5:
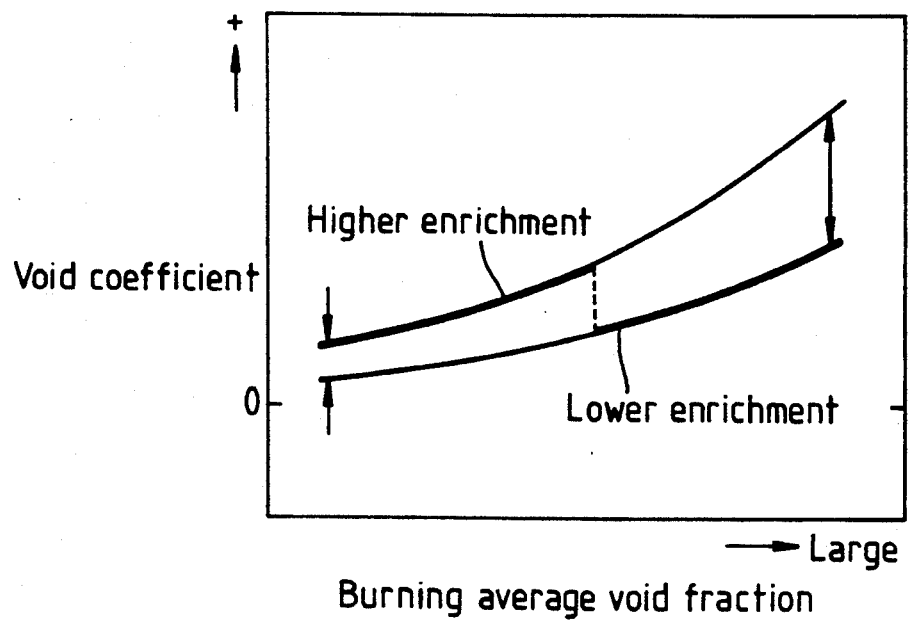
FIG. 5 is a graph showing a relationship between burning average void fraction and void coefficient.

FIG. 5 shows a relation between burning average void fraction (an average void fraction value during the fuel burning period) and void coefficient. The curve assumes a constant burn-up value and water:fuel geometrical ratio of 0.5. It is seen that, even when two fuels have the same enrichment of plutonium, a larger void coefficient is achieved when a fuel has a higher burning average void fraction, owing to a larger rate of change in neutron infinite multiplication factor with change in void fraction.

In operation of the reactor, coolant at the fuel assembly boils, with heat generated from nuclear fission, particularly at the upper region of the effective fuel region so that coolant void in this upper region is relatively large. Accordingly, this upper region—considered from halfway up the longitudinal axis—is a region with a high burning average void fraction and hence a large void coefficient. Use of fuel assemblies as shown in FIG. 2 reduces the relative enrichment of fissile plutonium in this upper region, and hence suppresses its contribution to void coefficient. Because the burning average void fraction is high here, this measure is particularly effective. Conversely, the relatively high enrichment of the fuel in the lower region increases reactivity in this region, where burning average void fraction is relatively small and hence the effective water:fuel volume ratio is larger than in the upper region. Thus, burning of fuel proceeds easily in this region and compensates for any lowering of upper-region reactivity owed to the relatively reduced fissile plutonium enrichment in the upper region.

The void coefficient contributions from a FIG. 2-type assembly are indicated schematically by the bold portions of the curves in FIG. 5. The left-hand end of the graph corresponds to the low average void fraction, i.e. the bottom of the core, and this has the high plutonium enrichment as shown by the bold line. Half-way up, there is a transition to lower plutonium enrichment for the upper half which has high void fraction. It should be noted that as void fraction increases, the difference between the void coefficients of high and low enrichment fuels gradually increases too. The reduction in void coefficient by a transition to lower enrichment is therefore especially marked.

To consider the advantage provided by the present embodiment, reactor conditions may be compared with a reactor core otherwise similar but loaded with fuel assemblies having a uniform 6.5% plutonium enrichment, all the way down the effective fuel region. Compared with this comparative example, the void coefficient suppression effect and reactivity increment effect of the fuel assemblies embodying the invention provided, when integrated and consolidated in the reactor core, a void coefficient reduced by about $0.4 \times 10^{-4} \Delta$ k/k/% void and a reactivity increased by about 0.1% $\Delta$ k/k. Thus the void coefficient is relatively low while reactivity is maintained.

Figure 6:
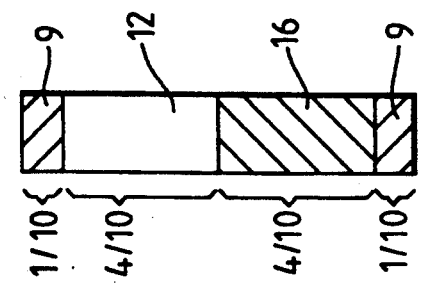
FIG. 6 is a schematic vertical section of the effective fuel region of a fuel assembly in a second embodiment.

FIG. 6 shows a second embodiment of fuel assembly. This corresponds to the first embodiment except as regards the distribution of plutonium enrichment in the effective fuel region. FIG. 6 shows extreme top and bottom regions of the assembly, each taking up one tenth of the total axial length of the effective fuel region. These comprise uranium-plutonium mixed oxide fuel 9 having 5.1% average fissile plutonium enrichment. The four-tenths of length up from the bottom end tenth 9, i.e. the segment up to the half-way line, consists of fuel 16 having 7.1% enrichment. The remaining four-tenths, i.e. the region from the 5/10 to the 9/10 line (considering the bottom of the assembly as a base line) comprises uranium-plutonium mixed oxide fuel 12 having 6.1% enrichment.

The average enrichment over the effective fuel region of this assembly is 6.3%. In the upper half, the average enrichment is 5.9%. In the lower half, the average enrichment is 6.7%.

The low-enrichment portions 9 at the extreme ends of the effective fuel region give small power output and slow burning, while the relatively more enriched fuel with large neutron infinite multiplication factor is in the central region where the contribution to reactivity is large. Overall, this gives increased reactivity. It is found that a reactor core (as previously described), loaded with such fuel assemblies has a reactivity larger by 0.5% $\Delta$k/k than a comparative reactor core having the same average enrichment (6.3%) but distributed uniformly along the axial length of the assembly. Indeed, this embodiment with average 6.3% enrichment achieves the same reactivity as a core using 6.5% average enrichment distributed uniformly.

Also, we find that in this embodiment the void coefficient is less by about $0.4 \times 10^{-4}$ $\Delta$k/k/% void than that achieved with a core using a uniformly distributed 6.5% enrichment, i.e. of the same reactivity.

Figure 7:
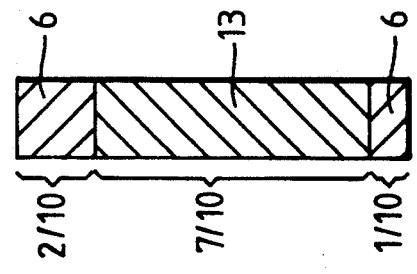
FIG. 7 is a schematic vertical section of the effective fuel region of a fuel assembly in a third embodiment.

FIG. 7 shows schematically a third embodiment. Apart from the distribution of enrichment, the make-up of the fuel assembly is the same as in the first embodiment. From the base line up to 1/10, and from the top down to 8/10, the effective fuel region has end regions containing 4.8% enriched fuel 6. Thus, the low-enrichment region at the top is twice as long as at the bottom. Between these regions 6, the region from 1/10 to 8/10 comprises uniformly 6.8% enriched fuel 13. Accordingly the average plutonium enrichment overall is 6.2%, that in the upper half of the effective fuel region is 6.0% and in the lower half 6.4%. This embodiment differs from the first two embodiments in that the halfway line does not correspond with any actual boundary between regions of different fuel enrichment.

We find that a reactor core loaded with fuel assemblies according to this embodiment has a void coefficient less by about $0.2\times10^{-4}$ $\Delta k/k/\%$ void than that of a corresponding core loaded with fuel assemblies having the 6.5% enrichment uniformly axially distributed through the effective fuel region. The advantage is therefore clear. Furthermore, the reactivity is greater by about 0.7% $\Delta k/k$ relative to the comparative case (6.2% uniformly), and is comparable with that achievable using 6.5% enriched fuel with a uniform axial distribution.

A particular advantage of this embodiment is that the fuel assembly comprises fuels of only two different degrees of enrichment. In particular, the aim is to improve the void coefficient, while forming the downstream (upper) part of the effective fuel region (where the fuel has high burning average void fraction and a large reactivity change with change in void fraction) with as few different enrichment grades as possible.

Figure 8:
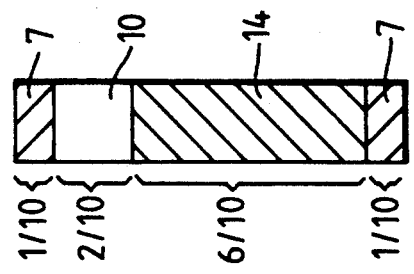
FIG. 8 is a schematic vertical section of the effective fuel region of a fuel assembly in a fourth embodiment.

FIG. 8 shows a fourth embodiment. As in the third embodiment, the half-way position at 5/10 does not coincide with any actual boundary between regions of different enrichment. As in the second embodiment the assembly has one-tenth end regions of relatively low enrichment, in this case of 4.85% enrichment fuel 7. A region from 2/10 to 7/10, i.e. most of the bottom half and part of the top half, is of 6.85% enriched uranium-plutonium mixed oxide fuel 14, while a region from 7/10 to 9/10 is 5.85% enrichment fuel 10. The average fissile plutonium enrichment over the effective fuel region is 6.25%, in the upper half 6.05% and in the lower half 6.45%.

While the effective fuel region is divided into four different enrichment sections, as in the second embodiment, the present embodiment contains a relatively larger region of high enrichment fuel with more fissile substance in that region. Consequently, the power load per unit weight of high enrichment fuel is less in this embodiment than in the second embodiment for the same whole-core operation power. Thus the burn-up of high enrichment fuel is relatively lower than in the second embodiment so that the increment of void coefficient due to increased burn-up (see FIG. 4) is relatively suppressed.

Compared with a loaded reactor core of similar fuel assemblies having an overall average enrichment of 6.5% distributed axially uniformly, the present embodiment gives a void coefficient smaller by about $0.6\times10^{-4}$ $\Delta k/k/\%$ void. This is a substantial improvement. As before, the low enrichment fuels positioned at the ends of the effective fuel region lead to an increased overall reactivity—a relative increase of about 0.6% $\Delta k/k$ relative to the comparative example (6.25% uniformly). This is the same reactivity as requires 6.5% average enrichment when that enrichment is uniformly axially distributed.

Figure 9:
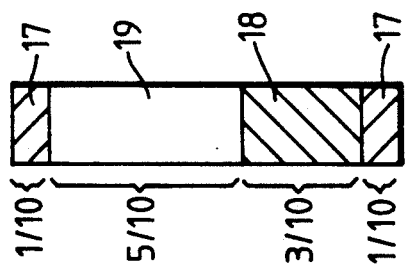
FIG. 9 is a schematic vertical section of the effective fuel region of a fuel assembly in a fifth embodiment.

Finally, FIG. 9 shows a fifth embodiment of fuel assembly. As in the third and fourth embodiments, the half-way mark of the effective fuel region does not coincide with any actual boundary between two regions of different plutonium enrichment. As before, the general construction of the fuel assembly is similar to that described for the first embodiment. The enrichment distribution, however, is as follows. As in the second embodiment the assembly has end regions of relatively low enrichment fuel 17, in this case 5.9% enrichment, each occupying one tenth of the axial extent of the fuel region. From 2/10 up to 4/10 i.e. a minor proportion of the central region at the bottom, the assembly comprises uniformly 6.9% enrichment uranium-plutonium mixed oxide fuel 18 while the remaining, upper, region from 5/10 to 9/10 i.e. a major proportion of the central axial length comprises uniformly 6.4% enrichment fuel 19. The average enrichment over the effective fuel region is 6.45%, in the upper half 6.3% and in the lower half 6.6%.

This is a relatively small difference in enrichment between the two halves. Consequently the burn-up of higher enrichment fuel is less than in the second embodiment above and there is relatively a suppression of the increment of void coefficient, based on the relation between burn-up and void coefficient shown in FIG. 4.

A reactor core loaded with fuel assemblies of this embodiment obtains the same reactivity as a reactor core using assemblies of 6.5% enriched fuel distributed uniformly, even though the average enrichment is 6.45% in the embodiment, and this reactivity is largely due to the placement of lower enrichment fuels at the ends of the effective fuel region. Furthermore, the reactor core has a void coefficient smaller by about $1.4\times10^{-4}$ $\Delta k/k/\%$ void than a core of equal reactivity having uniformly-distributed enrichment (i.e. of 6.5%). The improved effect is easy to perceive.

From the description above it will be seen that the assemblies described enable a reduction of a positive void coefficient in a high conversion ratio reactor core, without any decrease in reactivity, and hence enable improvement of power coefficient and safety margin values in such a reactor.

We claim:

1. A high conversion water reactor fuel assembly having a coolant inlet end and a coolant outlet end, comprising fuel rod housing means;

an array of uranium-plutonium mixed fuel rods supported in said housing means, the fuel rods extending axially to define an effective fuel region of the fuel assembly of axially-varying plutonium enrichment, in which the fuel rods are closely spaced side-by-side to provide a high fissile material conversion ratio in operation with water coolant flowing from the upstream end to the downstream end, and the effective fuel region comprising (a) an axially upstream half having a first average fissile plutonium enrichment value, and (b) an axially downstream half having a second average fissile plutonium enrichment value lower than said first average fissile plutonium enrichment value of the upstream half.

2. A fuel assembly as claimed in claim 1 in which the fuel rods in the effective fuel region are closely spaced side-by-side to provide an effective water to fuel volume ratio less than 0.4.

3. A fuel assembly as claimed in claim 2 in which said second average fissile plutonium enrichment value is at least 0.05% lower than said first average fissile plutonium enrichment value.

4. A fuel assembly as claimed in claim 3 in which said second average fissile plutonium enrichment value is at least 0.1% lower than said first average fissile plutonium enrichment value.

5. A fuel assembly as claimed in claim 2 in which the effective fuel region comprises first and second end portions adjacent the upstream end and downstream end respectively, the end portions having a low level of fissile plutonium enrichment, and a central portion extending between said end portions and having a higher level of fissile plutonium enrichment than said end portions.

6. A fuel assembly as claimed in claim 5 in which said central portion has a substantially uniform higher level of fissile plutonium enrichment along its length, and said first end portion is shorter than said second end portion whereby to provide said lower average fissile plutonium enrichment of the axially downstream half of the effective fuel region.

7. A fuel assembly as claimed in claim 5 in which the central portion has an upstream region and a downstream region, the upstream region having a highest fissile plutonium enrichment which is substantially axially uniform, and the downstream region having a less high fissile plutonium enrichment which is substantially axially uniform, to provide said lower average fissile plutonium enrichment of the axially downstream half of the effective fuel region.

8. A fuel assembly as claimed in claim 7 in which the downstream region of the central portion is substantially shorter than the upstream region of the central portion.

9. A method of operating a high conversion water reactor core using uranium-plutonium mixed fuel, comprising the steps of (a) providing a fuel assembly comprising housing means and a closely-spaced array of uranium-plutonium mixed fuel rods extending axially side-by-side in said housing means to form an effective fuel region of the fuel assembly, the effective fuel region having an axially-varying plutonium enrichment, with a first axial half of a first average fissile plutonium enrichment value and a second axial half of a second average fissile plutonium enrichment value lower than the first average fissile plutonium enrichment value;

(b) positioning the fuel assembly in the reactor core with said first axial half towards a coolant supply for the core and the second axial half towards a coolant discharge for the core, and (c) passing water coolant through the core from said supply to said discharge at high void fraction and high conversion ratio of fissile material in the fuel assembly.

10. A method as claimed in claim 9 in which in step (c) the effective volume ratio of water coolant to fuel in the effective fuel region is less than 0.4.

11. A method as claimed in claim 10 in which in step (c) the conversion ratio of fissile material is at least 0.6.

12. A method as claimed in claim 11 in which said conversion ratio is at least 0.8.

13. A method as claimed in claim 12 in which said conversion ratio is about 1.

14. A water reactor fuel assembly having an axially upstream end and an axially downstream end, and comprising fuel rod housing means;

an array of uranium-plutonium mixed fuel rods mounted in said housing means, the fuel rods extending axially to define an effective fuel region of the fuel assembly;

said effective fuel region comprising (a) a downstream end portion comprising uranium-plutonium mixed oxide fuel having a low enrichment of fissile plutonium;

(b) a downstream central portion comprising uranium-plutonium mixed oxide fuel having an intermediate enrichment of fissile plutonium;

(c) an upstream central portion comprising uranium-plutonium mixed oxide fuel having a high enrichment of fissile plutonium, and (d) an upstream end portion comprising uranium-plutonium mixed oxide fuel having a low enrichment of fissile plutonium, whereby a downstream half of the axial length of the fuel assembly has a lower average enrichment of fissile plutonium than an upstream half of the axial length thereof.

15. A fuel assembly as claimed in claim 14 in which the fuel rods in the effective fuel region have an effective water to fuel volume ratio of less than 0.4.

16. A fuel assembly as claimed in claim 15 in which, in each of the upstream central portion and downstream central portion, fissile plutonium enrichment is substantially uniformly axially distributed.

17. A fuel assembly as claimed in claim 15 in which the upstream central portion is substantially longer than the downstream central portion.

18. A water reactor fuel assembly having an axially upstream end and an axially downstream end, and comprising fuel rod housing means;

an array of uranium-plutonium mixed fuel rods mounted in said housing means, the fuel rods extending axially to define an effective fuel region of the fuel assembly;

said effective fuel region comprising (a) a longer, downstream end portion comprising uranium-plutonium mixed oxide fuel having a low fissile plutonium enrichment;

(b) a shorter, upstream end portion comprising uranium-plutonium mixed oxide fuel having a low enrichment of fissile plutonium, and (c) a central portion between said upstream and downstream end portions and comprising uranium-plutonium mixed oxide fuel having a high enrichment of fissile plutonium; whereby a downstream half of the axial length of the fuel assembly has a lower average enrichment of fissile plutonium than an upstream half of the axial length thereof.

19. A fuel assembly as claimed in claim 18 in which the fuel rods in the effective fuel region have an effective water to fuel volume ration of less than 0.4.

20. A fuel assembly as claimed in claim 19 in which, in said central portion, the high enrichment of fissile plutonium is distributed substantially uniformly along the axial length of said central portion.

21. An improved method of operating a light water cooled, light water moderated reactor having a reactor core comprising at least one fuel assembly having uranium-plutonium mixed fuel rods, said fuel assembly having an effective axial fuel region formed by said fuel rods, by passing light water coolant through said core from an upstream end to a downstream end thereof at an effective water:fuel volume ratio less than 0.4 in said effective fuel region, and converting fissile material in said fuel assembly at a conversion ratio of at least 0.8, wherein the improvement comprises providing an axial non-uniformity of plutonium enrichment in said fuel assembly whereby a downstream axial half of said assembly comprises uranium-plutonium mixed oxide fuel having an average plutonium enrichment at least 0.05% less than an average plutonium enrichment of an upstream axial half of said assembly.

22. A nuclear reactor comprising a reactor core and means for passing coolant through said core from an upstream end to a downstream end thereof, the core comprising at least one fuel assembly as claimed in claim 2.

* * * * *